(12) United States Patent
Levi et al.

(10) Patent No.: US 10,046,715 B2
(45) Date of Patent: Aug. 14, 2018

(54) SYSTEMS AND METHODS FOR OBJECT DETECTION

(71) Applicant: GM GLOBAL TECHNOLOGY OPERATIONS LLC, Detroit, MI (US)

(72) Inventors: Dan Levi, Kyriat Ono (IL); Shai Silberstein, Ness Ziona (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 238 days.

(21) Appl. No.: 14/918,267

(22) Filed: Oct. 20, 2015

(65) Prior Publication Data

US 2016/0117560 A1 Apr. 28, 2016

Related U.S. Application Data

(60) Provisional application No. 62/067,106, filed on Oct. 22, 2014.

(51) Int. Cl.
| | |
|---|---|
| *G06K 9/00* | (2006.01) |
| *B60R 11/04* | (2006.01) |
| *H04N 7/18* | (2006.01) |
| *B60R 1/00* | (2006.01) |

(52) U.S. Cl.
CPC ............. *B60R 11/04* (2013.01); *B60R 1/00* (2013.01); *G06K 9/00805* (2013.01); *B60R 2300/307* (2013.01)

(58) Field of Classification Search
CPC ..... G06K 9/00791; H04N 7/181; B60R 11/04
USPC .......................................................... 348/148
See application file for complete search history.

(56) References Cited

U.S. PATENT DOCUMENTS

| | | | | |
|---|---|---|---|---|
| 2007/0127774 | A1* | 6/2007 | Zhang ................ | G06K 9/00771 382/103 |
| 2008/0273752 | A1* | 11/2008 | Zhu ....................... | B60W 40/02 382/103 |

* cited by examiner

*Primary Examiner* — Hee-Yong Kim
(74) *Attorney, Agent, or Firm* — Lorenz & Kopf, LLP

(57) ABSTRACT

Systems and methods for detecting objects from a moving platform are provided. The method includes receiving, from a camera coupled to the moving platform, first and second image frames, wherein the second image frame is subsequent in time to the first image frame. Within the first image frame, a first target is defined characterizing the location of an object detected in the first image frame. A first score associated with the first target and a second score associated with the second target are determined, and a first predicted target is determined based on a tracking process applied to the first target. A third score associated with the first predicted target is determined. The method determines a merged target corresponding to the second target when the second score is greater than the third score and a proximity measure between the second target and the first predicted target is above a threshold.

20 Claims, 4 Drawing Sheets

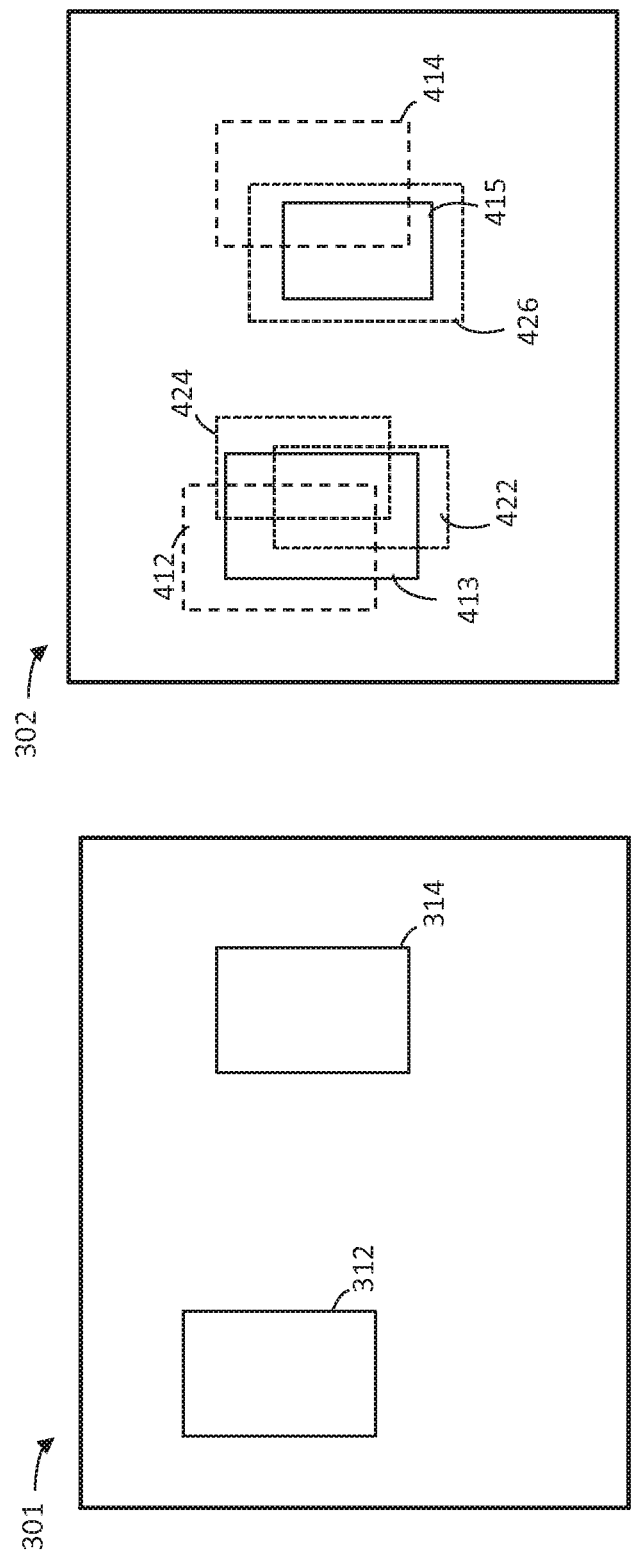

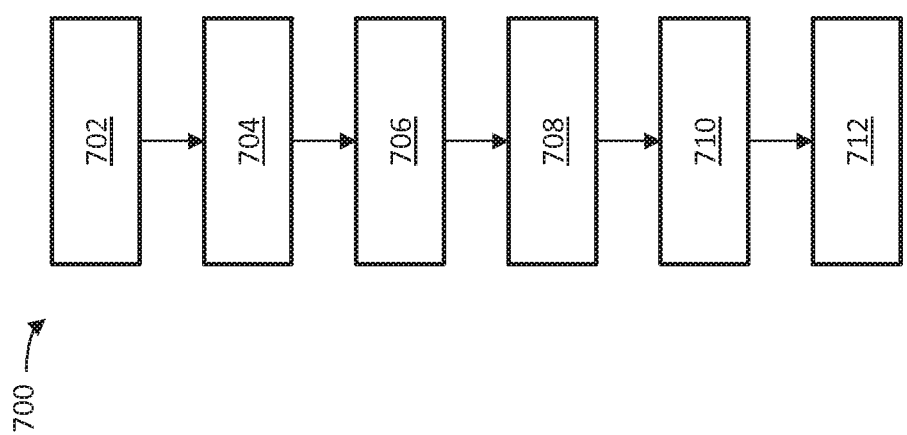

SYSTEMS AND METHODS FOR OBJECT DETECTION

CROSS-REFERENCE TO RELATED APPLICATIONS

This application claims priority to Provisional Patent Application No. 62/067,106, filed Oct. 22, 2014, the contents of which are hereby incorporated by reference.

TECHNICAL FIELD

The technical field generally relates to object detection, and more particularly relates to systems and methods for video-based object detection from a moving platform.

BACKGROUND

It is often desirable to detect and track objects from the point of view of a moving platform. Advanced automotive vehicles, for example, may incorporate one or more cameras that are capable of viewing the vehicle's environment, including any objects, such as pedestrians, in the field of view of the cameras. In such cases, when both the vehicle and the object(s) of interest may be moving relative to the environment, the vehicle may have difficulty identifying individual objects in its vicinity by inspection of individual camera frames alone. Such object detection may be particularly difficult in cases where are large number of candidate objects may be present within the field-of-view of the cameras.

Accordingly, it is desirable to provide improved systems and methods for detecting objects from the standpoint of a moving platform, such as a motor vehicle. Additional desirable features and characteristics of the present invention will become apparent from the subsequent detailed description and the appended claims, taken in conjunction with the accompanying drawings and the foregoing technical field and background.

SUMMARY

A method for detecting objects from a moving platform in accordance with one embodiment includes receiving, from a camera coupled to the moving platform, a first image frame, and defining, within the first image frame, a first target characterizing a location of an object detected in the first image frame. The method further includes determining a first score associated with the first target, receiving, from the camera, a second image frame subsequent in time to the first image frame, and defining, within the second image frame, a second target characterizing the location of the object in the second image frame. The method continues by determining a second score associated with the second target; defining, within the second image frame, a first predicted target based on a tracking process applied to the first target; determining a third score associated with the first predicted target; and defining a merged target corresponding to the second target when the second score is greater than the third score and the overlap area of the second target and the first predicted target is greater than a predetermined threshold.

An object detection system for a moving platform in accordance with one embodiment includes a visual tracking module communicatively coupled to a detection module. The detection module is configured to: receive, from a camera coupled to the moving platform, a first image frame and a second image frame subsequent in time to the second image frame; define, within the first image frame, a first target characterizing the location of an object detected in the first image frame and to define, within the second image frame, a second target characterizing the location of the object in the second image frame; determine a first score associated with the first target. The detection module is further configured to determine a second score associated with the second target; receive, from the visual tracking module, a first predicted target based on a tracking process applied to the first target; determine a third score associated with the first predicted target; and define a merged target corresponding to the second target when the second score is greater than the third score and the overlap area of the second target and the first predicted target is greater than a predetermined threshold.

DESCRIPTION OF THE DRAWINGS

The exemplary embodiments will hereinafter be described in conjunction with the following drawing figures, wherein like numerals denote like elements, and wherein:

FIGS. 3 and 4 depict successive frames produced by a camera in accordance with an exemplary embodiment;

FIG. 7 is a flowchart depicting an objection detection method in accordance with various embodiments.

DETAILED DESCRIPTION

The subject matter described herein generally relates to improved systems and methods for detecting objects from the standpoint of a moving platform. As a non-limiting example, the systems and methods described herein may be employed to more accurately and reliably detect pedestrians in the vicinity of a moving platform, such as a robotic device, an aircraft, an automotive vehicle, a rotorcraft, a train, a marine vessel, or the like.

The following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
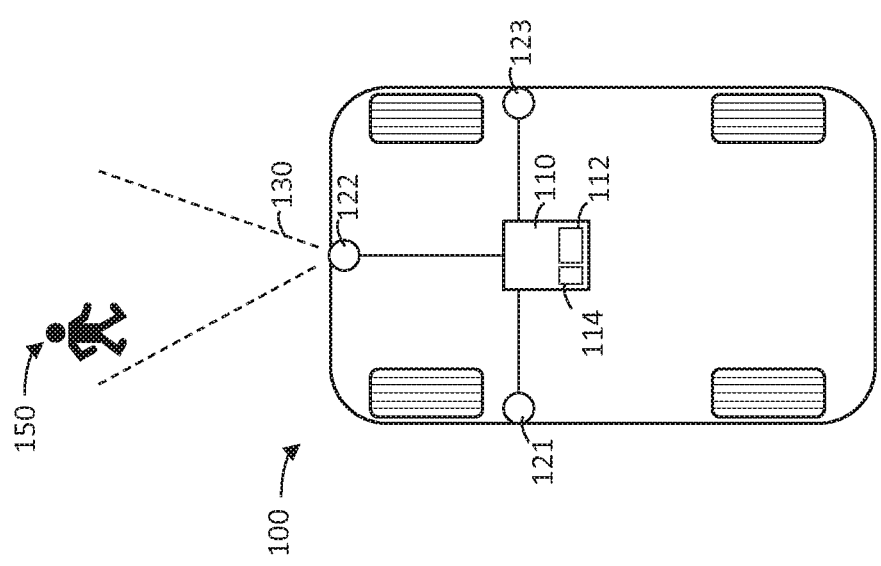
FIG. 1 is a conceptual overview of a moving platform (e.g., a vehicle) in accordance with an exemplary embodiment.

FIG. 1 is a conceptual overview of a moving platform (or simply "platform") 100 in accordance with an exemplary embodiment. As used herein, the term "moving platform" refers to any structure (e.g., an automotive vehicle, marine craft, aircraft, robot, or the like) that is capable of moving via translation and/or rotation with respect to its environment. In that regard, while various embodiments may be described herein, without loss of generality, in the context of pedestrian detection performed by an automotive vehicle, the range of potential embodiments is not so limited: the present systems and methods may be employed in any context where object detection and tracking is desirable.

With continued reference to FIG. 1, platform 100 includes one or more cameras 121, 122, and 123 communicatively coupled (e.g., via a suitable data bus or other wired or wireless connection) to an object detection module (or simply "module") 110. Cameras 121-123 may be implemented as any combination of hardware and/or software capable of acquiring multiple image frames (e.g., a video stream) of the environment in which platform 100 is operating. Cameras 121-123 may, for example, be implemented as CCD cameras with suitable optics (e.g., lenses) and associated electronics configured to produce a series of image frames comprising a matrix of pixels, as is known in the art.

The placement of such cameras 121-123 may vary, depending upon the particular application in which they are employed. In FIG. 1, for example, in which platform 100 is illustrated as an automotive vehicle, camera 122 is shown as being located toward the "front" of platform 100 (corresponding to the topmost portion), while cameras 121 and 123 are located at opposite sides of platform 100. Each camera 121-123 will generally have an associated field-of-view, i.e., a region of the environment that is viewable to that camera. Camera 122, has a field of view indicated by dotted lines. Accordingly, as shown, camera 122 is capable of producing image frames associated with an object of interest (or simply "object") 150 within field of view 130.

Object of interest 150 may be substantially stationary (e.g., buildings, street signs, foliage, and the like), or may be moving with respect to the environment (e.g., walking or running humans, pets, other moving platforms, etc.). Further, any number of objects 150 may be present within the environment and may be detected by one or more of cameras 121-123. As described in further detail below, module 110 is capable of reliably and accurately detecting one or more objects of interest 150.

Module 110 includes any suitable combination of hardware and/or software capable of carrying out the various processes described herein. In the illustrated embodiment, for example, module 110 includes a processor 114 as well as a memory 112 for storing machine readable software instructions that, when executed by processor 114, are capable of carrying out object detection as described below. In some embodiments, module 110 implemented as part of another module integrated into platform 100, such as a visual processing module (not illustrated). In some embodiments, the functionality of module 110 is distributed over multiple computational entities within or external to platform 100.

Figure 2:
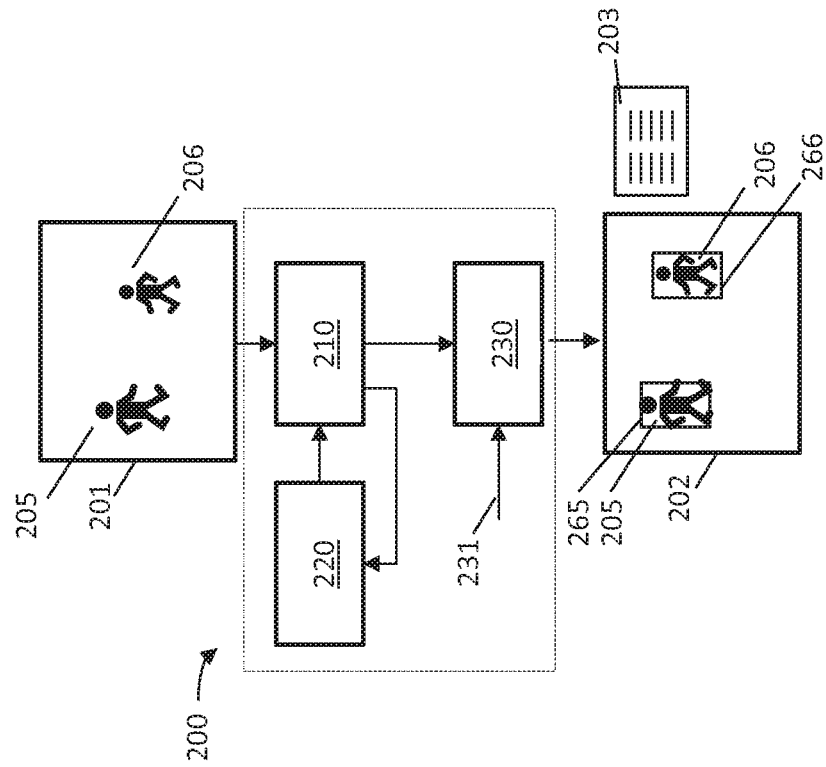
FIG. 2 is a conceptual block diagram of an object detection system in accordance with an exemplary embodiment.

FIG. 2 is a conceptual block diagram of an object detection module (or simply "module") 200 in accordance with one implementation of the object detection module 110 of FIG. 1. In general, module 200 includes a detector module 210, a visual tracking module 220, and a target motion module 230. Together, as described in further detail below, these components (210, 220, and 230) are configured to receive (e.g., from one of the cameras 121-123 of FIG. 1) an image frame (or simply "frame") 201 in which one or more objects of interest 205, 206 are present. Module 210 then produces object detection information including "targets" 265 and 266 corresponding, respectively, to objects of interest (or simply "objects") 205 and 206, as well as detection score data 203.

As used herein, the term "target" as used with respect to particular objects within an image frame refers to any geometrical shape that characterizes the size, shape, and/or position of that object within the frame. In FIG. 2, for example, target 265 is a bounding rectangle corresponding to object 205, and target 266 is a bounding rectangle corresponding to object 206. This is indicated by target information frame 202. The embodiments are not limited to the use of bounding rectangles, however; any suitable shape (e.g., polygon, curvilinear closed curve, or the like) that substantially bounds or surrounds the object, may be employed.

Detection score data 203 (which may be stored, for example, within memory 112 of FIG. 1), comprises any set of data that characterizes the confidence with which module 200 considers targets 265 and 266 to be associated with their respective objects 205 and 206. For example, detection score data 203 might include a target score of 2 (on a scale of 0-10, with 10 being the greatest confidence) for target 265, and a target score of 7 for target 266. The embodiments are not limited to integer target score values, however. Real numbers, alphanumeric characters, or any other data type may be employed. Detection score data 203 may also include a target ID (uniquely identifying a target), track time for the target (e.g., time since first detection of the target), and any other attributes that might assist in object detection.

Detector module 210 is configured to detect the presence of objects within single frame 201 using any suitable image processing technique known in the art, and then provide information regarding those objects (e.g., target information and "detection scores") to visual tracking module 220 as well as target motion module 230. Detector module 210 also receives targets from previous frames from visual tracking module 220. As described below, detector module 210 is capable of using target information and detection score data 203 from one or more previous frames to improve the accuracy of the detection score data 203 that is ultimately produced by visual tracking module 220.

Visual tracking module 220 includes any suitable combination of hardware and/or software configured to predict the position of targets in a second frame, given target information from the first frame. Module 220 may include, for example, one or more processors, memory devices, and the like. Such tracking may be performed in a variety of ways. In one embodiment, for example, in which the targets are bounding boxes (such as 265 and 266) a Kanade-Lucas-Tomasi (KLT) feature tracker process is performed in order to determine a similarity transformation that predicts the bounding box location and scale of a given target in a second frame given target information from the first frame.

In accordance with one embodiment, module 200 performs "non-maximal suppression" (NMS) tracking to improve the accuracy of object detection (i.e., the accuracy of detection score data 203 associated with targets 265 and 266). As described in further detail below, NMS tracking generally includes "merging" detection score data from multiple detected targets when those targets are sufficiently close, spatially, within the image frame 201—e.g., when the targets overlap by a predetermined amount.

Target motion module 230 generally includes any suitable combination of hardware and software configured to determine local motion values for each target in order to provide a higher target score for those objects that show apparent relative motion with respect to the environment. That is, detection of an object 205 or 206 that is moving with respect to a wall, roadway, or other part of the environment is more likely to be a valid "object of interest" (e.g., 150) and consequently the target score for that object (as stored in detection score data 203) may likewise be increased relative to its "base" target score as described above. Target motion module 230 may receive various data regarding platform 100, including odometric data 231 characterizing the position and/or velocity of platform 100.

Referring now to FIGS. 3 and 4, which depict successive image frames (or simply "frames") 301 and 302 produced by a camera (e.g., 121) in accordance with one example, NMS tracking will now be described in further detail.

As shown, frame 301 includes two detected targets: target 312 and target 314, each illustrated as a bounding box. As described in further detail below, these targets 312, 314 may be detected using any suitable camera or other detection device. In subsequent frame 302 (i.e., after some time has elapsed, accompanied by movement of the corresponding objects as well as the moving platform 100 itself), the detector module 210 also considers the predicted (or "transformed") targets 413 and 415 corresponding to targets 312 and 314, respectively. The previous positions of targets 312 and 314 are represented in FIG. 4 as dotted rectangles 412 and 414. That is, targets 413 and 415 are produced by visual tracking module 220, and correspond to the predicted location of the targets, given their previously determined velocity, acceleration, etc. Furthermore, three new targets have been detected in frame 302: target 422, target 424, and target 426. As will be apparent, targets 424, 413, and 422 overlap each other to varying extents. Similarly, targets 415 and 426 overlap such that target 415 lies fully within the bounding rectangle defined by target 426.

In accordance with NMS tracking, one or more targets in frame 302 may be merged based on their respective target scores and whether and to what extent the targets overlap or are otherwise close to each other. In one embodiment, two targets may be considered sufficiently overlapping if the intersection area is larger than a predetermined factor multiplied by the geometric average of the targets area. For example, if a first target has an area of 2.0 (using any appropriate units), and the second target has an area of 8.0, then the geometric average of their areas is sqr(2.0·8.0), or 4.0. If the predetermined factor is, for example, 0.4, then the two targets will be considered sufficiently overlapping (for the purposes of NMS tracking), if the intersection of the two targets is greater than 1.6. In some embodiments, a proximity measure (e.g., distance between centers, etc.) associated with the second target and the first predicted target is tested to determine whether it is above a predetermined threshold.

With continued reference to FIG. 4, consider the case where the target score for target 413 is 4, the target score for target 415 is 6, the target score for target 422 is 3, the target score for target 424 is 1, and the target score for target 426 is 7. Using NMS tracking, target 413 will remain, and target data associated with targets 422 and 424 will be merged into the target data associated with target 413 (since target 413 had the highest score). Similarly, target 426 will remain, and target data associated with target 415 is merged into the data associated with target 426. That is, detection score data 203 as shown in FIG. 2 is simplified such that it will (after analysis of frame 302) include only data associated with targets 413 and 426. In that regard, detection score data 203 may be stored in a memory device for subsequent recall and analysis. In some embodiments, the merged target score based is modified based on a track history associated with the merged target.

Target data is merged in the sense that the target ID of the "remaining" target is stored along with the track time of the oldest of the merged targets. In the case where the multiple targets have the same ID, a new ID is provided for all targets except those targets having the highest score. In addition, the target score may be increased by a constant, as long as it does not exceed the "initial" score of that target. Targets may also be removed from detection score data 203 when their scores are below some predetermined threshold (e.g., a target score of 2).

In various embodiments, detection score data 203 (stored, e.g., in memory 112) is improved by applying similar "pruning" processes. For example, targets may be removed (or their target scores reduced), when they have not been detected for a predetermined number N frames, or when they not been detected in at least M of the last N frames. In another example, a target may be removed, or its target score reduced, based on target history, such as velocity, total movement, time from first detection, size change, average target score, maximum/minimum score, or any other such statistic associated with the target.

As mentioned above, target motion module 230 generally includes any suitable combination of hardware and software configured to determine local motion values for each target in order to provide a higher target score for those objects that show apparent relative motion with respect to the environment. In this regard, the surroundings are examined in order to help distinguishing between real target motion and motion caused by the camera's own motion.

Figure 5:
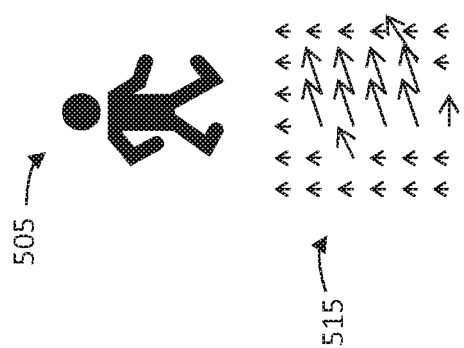
FIG. 5 is a conceptual illustration of motion feature detection in accordance with various embodiments.

In one embodiment, local motion is calculated in the following way. First, dense image flow is calculated at the target area using, for example, a Farneback algorithm as is known in the art. Alternatively, other calculation methods and sparse flow may be used. FIG. 5 is a conceptual illustration of motion feature detection in accordance with one embodiment, and illustrates an object 50 and a vector field 515 of movement related to object 505. Vector field 515 indicates the instantaneous movement of different points within the image of object 505, and is computed based on the image of the current frame (e.g., frame 302 of FIG. 4) and the image from one frame (or few frames) before (e.g., frame 301 in FIG. 3). Flow (e.g., movement) at smooth areas may be neglected as the flow at these areas typically have low reliability. Smoothness can be determined by the local standard deviation, corner detection, or in any other way.

Figure 6:
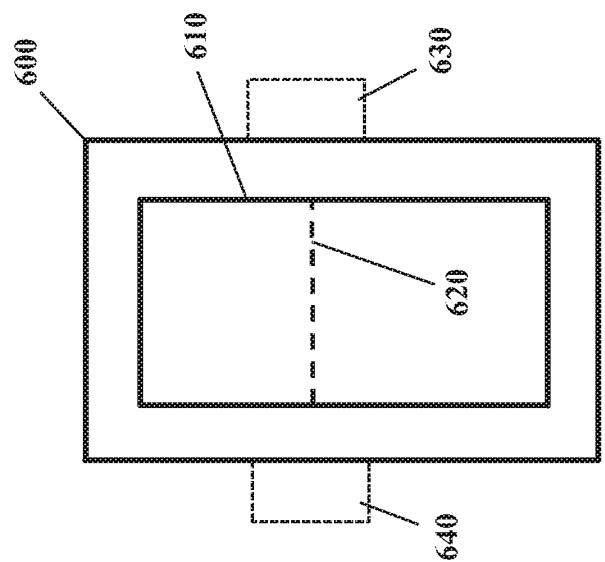
FIG. 6 is a conceptual block diagram depicting calculation of local motion in accordance with various embodiments.

FIG. 6 is a conceptual diagram useful in describing calculation of local motion in accordance with one embodiment, such as an embodiment in which the object of interest is a pedestrian. Specifically, for each target 600, a target score is calculated based on the found local motion at the x-axis. In one example, the score is calculated at the center of the track (610) to minimize or prevent the background surrounding the target's area being used in the calculations. For each pixel row 620 within the image, the motion outside the target 600 is estimated by taking the minimal and maximal motion at an area to the side of the target 600. For example, the minimum and maximum are measured on two areas 8 pixels wide and 32 pixel high—one area 630 to the right of the target 600, and one area 640 to the left of the target 600.

A variety of techniques may be used to estimate the motion outside the target 600. In one embodiment, the local motion (val) of each pixel at row 620 is compared to the maximum (max) and minimum (min) values of areas 630 and 640 as following:

$$\text{Comparison Result} = \begin{Bmatrix} val - max \\ 0 \\ min - val \end{Bmatrix} \begin{matrix} val > max \\ min \leq val \leq max \\ val < min \end{matrix}$$

This comparison is carried out for motion along the x and y axes separately, and the local motion of each pixel is assigned to the Euclidean distance of the comparison result of x and y axes. Pixels with unknown motion (e.g., within smooth areas) are not used in the minimum and maximum calculation. From all tested pixels in target 600, the highest 85% (or some other threshold value) is taken as the motion score. This is performed in order to further reduce background and to catch motion of a pedestrian's limbs, and the like.

The local motion score LM (i.e., the "new score" associated with the second frame) may be combined with the pedestrian detection score (i.e., what has been referred to previously as the "target score") PD, in a variety of ways, such as:

New Score=$PD+\alpha \cdot LM$

New Score=$PD+\alpha \cdot \max(LM,\beta)$

New Score=$PD+\alpha \cdot x$ ($x=1$ if $LM>0$; and $x=0$ otherwise)

New Score=$PD+\beta \cdot e^{-\alpha \cdot LM}$

Where $\alpha$ and $\beta$ are constants.

When camera movement is high (such as when the platform is moving fast), a high local motion may be obtained from objects 150 in the scene that are not adjacent to walls (like, for example, traffic signs). To reduce this effect, the contribution of the local motion may be forced lower as the camera movement is greater. The reduction may be accomplished by multiplying by a suitable factor, such as $e^{-\gamma \cdot self\ motion}$, wherein the superscript $\gamma$ self motion is the motion of the camera, such as camera 121.

In this example, the contribution to pedestrian detection score or the target score is given by:

New Score=$PD+\alpha \cdot (LM>0) \cdot e^{-\gamma \cdot self\ motion}$

In accordance with another embodiment, targets (e.g., objects 150) closer to the camera 121-123 are assumed to be more reliable. Accordingly, the target scores are increased for close targets. The camera target distance may be measured as the Euclidian distance between the target and the camera 121-123 or as the target distance projected to the camera view axis (referred as depth). The score increase may be accomplished, for example, by multiplying the target score by $\beta \cdot e - \alpha \cdot$Depth.

FIG. 7 is a flowchart depicting an objection detection method 700 in accordance with one embodiment, and will be described in conjunction with FIGS. 1-4. Initially, at 702, a first image frame (e.g., 301) is received from a camera coupled to a moving platform (e.g., camera 122 in FIG. 1). Next, at 704, a first target 312 is defined within the first image frame 301 that characterizes the location of an object detected in the first image frame. Also at 704, a first score 415 (e.g., a score characterizing the confidence level of the target) associated with the first target is determined. At 706, a second image frame 302 subsequent in time to the first image frame 301 is received. A second target 413 characterizing the location of the object in the second image frame is then determined along with a second score associated with the second target at 708. At 710, a first predicted target 422 is determined based on a tracking process applied to the first target 312. That is, an expected position and size of the target is determined based on tracked motion of the first target from the first frame to the second frame. A third score associated with the first predicted target 422 is also determined at 710. Finally, at 712, a merged target (e.g., 422) corresponding to the second target is defined when the second score is greater than the third score and the overlap area of the second target 413 and the first predicted target 424 is greater than a predetermined threshold.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for detecting objects from a moving platform, the method comprising:
   receiving, from a camera coupled to the moving platform, a first image frame;
   defining, within the first image frame, a first target characterizing a location of an object detected in the first image frame;
   determining a first detection score associated with the first target;
   receiving, from the camera, a second image frame subsequent in time to the first image frame;
   defining, within the second image frame, a second target characterizing the location of the object in the second image frame;
   determining a second detection score associated with the second target;
   defining, within the second image frame, a first predicted target based on a tracking process applied to the first target;
   determining a third detection score associated with the first predicted target; and
   defining a merged target corresponding to the second target when the second detection score is greater than the third detection score and a proximity measure between the second target and the first predicted target is above a predetermined threshold.

2. The method of claim 1, further comprising defining the merged target corresponding to the first predicted target when the third detection score is greater than the second detection score and the overlap area of the second target and the first predicted target is greater than a predetermined threshold.

3. The method of claim 1, wherein the moving platform is a vehicle.

4. The method of claim 1, further comprising increasing the merged target detection score based on local motion detected within at least one of the first image frame and the second image frame.

5. The method of claim 4, further comprising decreasing the merged target detection score when a velocity of the moving platform is above a threshold value.

6. The method of claim 1, further comprising ignoring the second target when it has not been detected for a predetermined number of frames.

7. The method of claim 1, further comprising modifying the merged target detection score based on a distance from the camera to an object corresponding to the merged target.

8. The method of claim 1, further comprising modifying the merged target detection score based on a track history associated with the merged target.

9. An object detection system for a moving platform, the system comprising:
   a visual tracking module; and
   a detection module communicatively coupled to the visual tracking module, the detection module configured to:
      receive, from a camera coupled to the moving platform, a first image frame and a second image frame subsequent in time to the second image frame;
      define, within the first image frame, a first target characterizing a location of an object detected in the first image frame and to define, within the second image frame, a second target characterizing the location of the object in the second image frame;
      determine a first detection score associated with the first target;
      determine a second detection score associated with the second target;
      receive, from the visual tracking module, a first predicted target based on a tracking process applied to the first target;
      determine a third detection score associated with the first predicted target; and
      define a merged target corresponding to the second target when the second detection score is greater than the third detection score and the overlap area of the second target and the first predicted target is greater than a predetermined threshold.

10. The system of claim 9, wherein the detection module is further configured to define the merged target corresponding to the first predicted target when the third detection score is greater than the second detection score and the overlap area of the second target and the first predicted target is greater than a predetermined threshold.

11. The system of claim 9, wherein the moving platform is a vehicle.

12. The system of claim 9, further comprising a target motion module configured to increase the merged target detection score based on local motion detected within at least one of the first image frame and the second image frame.

13. The system of claim 12, wherein the target motion module is configured to decrease the merged target detection score when a velocity of the moving platform is above a threshold value.

14. The system of claim 9, further including ignoring the second target when it has not been detected for a predetermined number of frames.

15. The system of claim 9, wherein the detection module is configured to modify the merged target detection score based on a distance from the camera to an object corresponding to the merged target.

16. The system of claim 9, wherein the detection module is configured to modify the merged target detection score based on a track history associated with the merged target.

17. A vehicle, comprising:
   a camera configured to produce a plurality of image frames associated with an environment in the vicinity of the vehicle;
   an object detection system communicatively coupled to the camera, the system comprising:
   a visual tracking module; and
   a detection module communicatively coupled to the visual tracking module, the detection module configured to:
      receive, from a camera coupled to the moving platform, a first image frame and a second image frame subsequent in time to the second image frame;
      define, within the first image frame, a first target characterizing a location of an object detected in the first image frame and to define, within the second image frame, a second target characterizing the location of the object in the second image frame;
      determine a first detection score associated with the first target;
      determine a second detection score associated with the second target;
      receive, from the visual tracking module, a first predicted target based on a tracking process applied to the first target;
      determine a third detection score associated with the first predicted target; and
      define a merged target corresponding to the second target when the second detection score is greater than the third detection score and the overlap area of the second target and the first predicted target is greater than a predetermined threshold.

18. The vehicle of claim 17, wherein the detection module is further configured to define the merged target corresponding to the first predicted target when the third detection score is greater than the second detection score and the overlap area of the second target and the first predicted target is greater than a predetermined threshold.

19. The vehicle of claim 17, wherein the object detection system includes a target motion module configured to increase the merged target detection score based on local motion detected within at least one of the first image frame and the second image frame.

20. The vehicle of claim 17, wherein the detection module is configured to modify the merged target detection score based on a distance from the camera to an object corresponding to the merged target.

* * * * *